United States Patent [19]
Yamashita et al.

[11] Patent Number: 5,371,746
[45] Date of Patent: Dec. 6, 1994

[54] PROGRAM DEBUGGING SYSTEM FOR A DISTRIBUTED DATA PROCESSING SYSTEM

[75] Inventors: Ichiro Yamashita; Shigehisa Kawabe, both of Kanagawa, Japan

[73] Assignee: Fuji Xerox Co., Ltd., Tokyo, Japan

[21] Appl. No.: 855,741

[22] Filed: Mar. 23, 1992

[30] Foreign Application Priority Data

May 31, 1991 [JP] Japan ................................. 3-156013

[51] Int. Cl.⁵ .......................................... G06F 15/20
[52] U.S. Cl. ..................................... 371/19; 395/375; 364/285.2
[58] Field of Search ................... 371/19; 395/200, 375, 395/550, 575; 364/267.91, 285.2

[56] References Cited

U.S. PATENT DOCUMENTS

| 5,253,342 | 10/1993 | Blount et al. | 395/200 |
| 5,273,691 | 8/1993 | Robinson et al. | 395/700 |

OTHER PUBLICATIONS

"Fault Tolerance Under UNIX" by Anita Borg et al., ACM Transactions on Computer Systems, vol. 7, No. 1, pp. 1, 16–17, Feb. 1989.
"Fault Tolerant Sytsem" by J. Gray et al., McGraw-Hill, pp. 25–26, 207 in Japanese.
"Frontiers of Distributed Computing Systems", Nikkei Electronics, Jul. 11, 1990, No. 502, pp. 122–148.
"Pilgrim: A Debugger for Distributed Systems", Proc. of 7th Int. Conf. on Distributed Computing Systems, Robert Cooper, pp. 458–465 (Sep. 1987), § 5.2, Distributed break pointing in Pilgrim.

*Primary Examiner*—Vincent P. Canney
*Attorney, Agent, or Firm*—Finnegan, Henderson, Farabow, Garrett & Dunner

[57] ABSTRACT

A program debugging system for a distributed data processing system of the type in which a plurality of processes communicate with one another to realize their concurrent and parallel operations. The debugging system includes a plurality of satellite debugging units, coupled respectively with the plurality of processes, for debugging the processes; a central debugging unit for remotely controlling the plurality of satellite debugging units; and a remote-procedure-call detecting unit for previously detecting an issuance or an end of a remote procedure call in the process to be debugged by the satellite debugging units. In the debugging system, each of the satellite debugging units includes an execution interrupting unit for interrupting the execution of the process to be debugged and transmitting a message of the execution-interruption to the central debugging unit; an execution restarting unit for restarting the execution of the interrupted process and transmitting a message of the execution-restart to the central debugging unit; an interruption-time notifying unit for calculating an execution-interruption time on the basis of the interruption and restart of the execution of the process and for transmitting the calculated interruption time to the central debugging unit; and an execution delay unit for delaying, when the remote-procedure-call detecting unit detects the issuance of a remote procedure call by a process, the execution of the remote procedure call according to information including the execution-interruption time of another process that is transmitted from the central debugging unit.

11 Claims, 12 Drawing Sheets

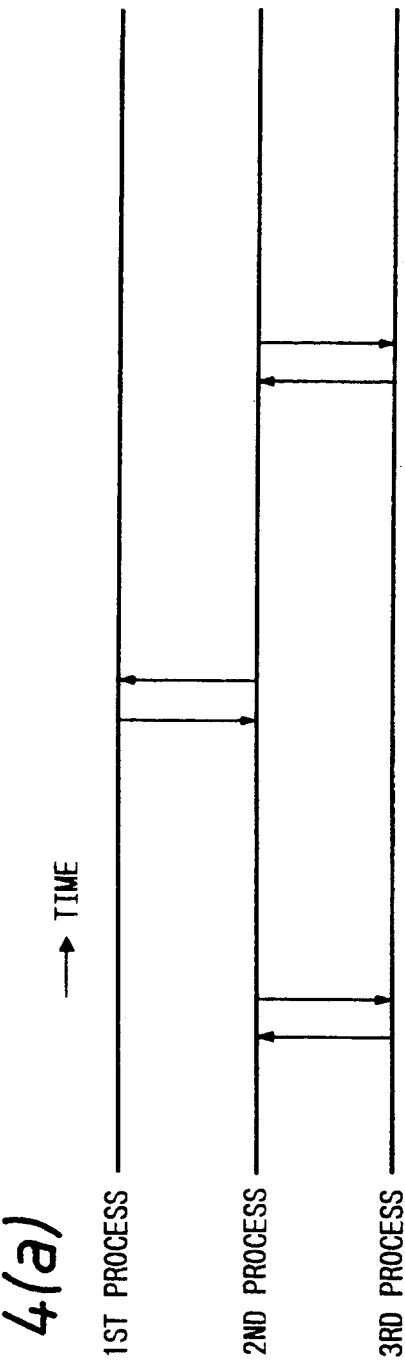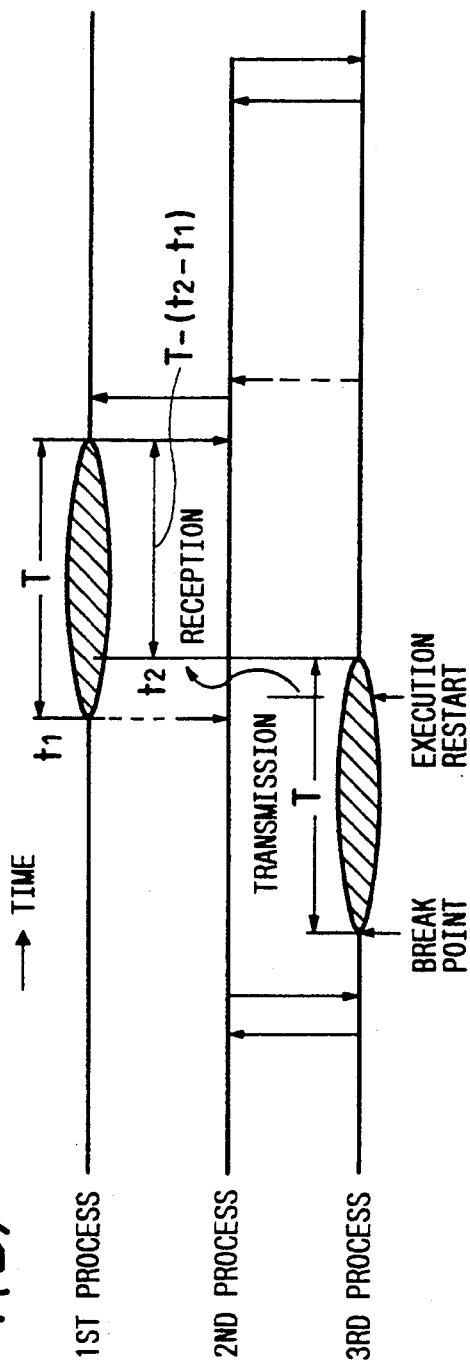

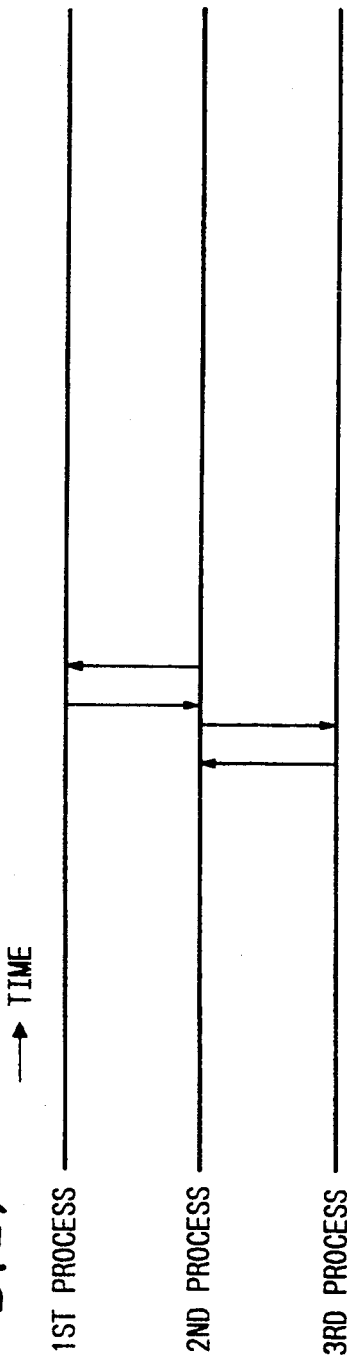
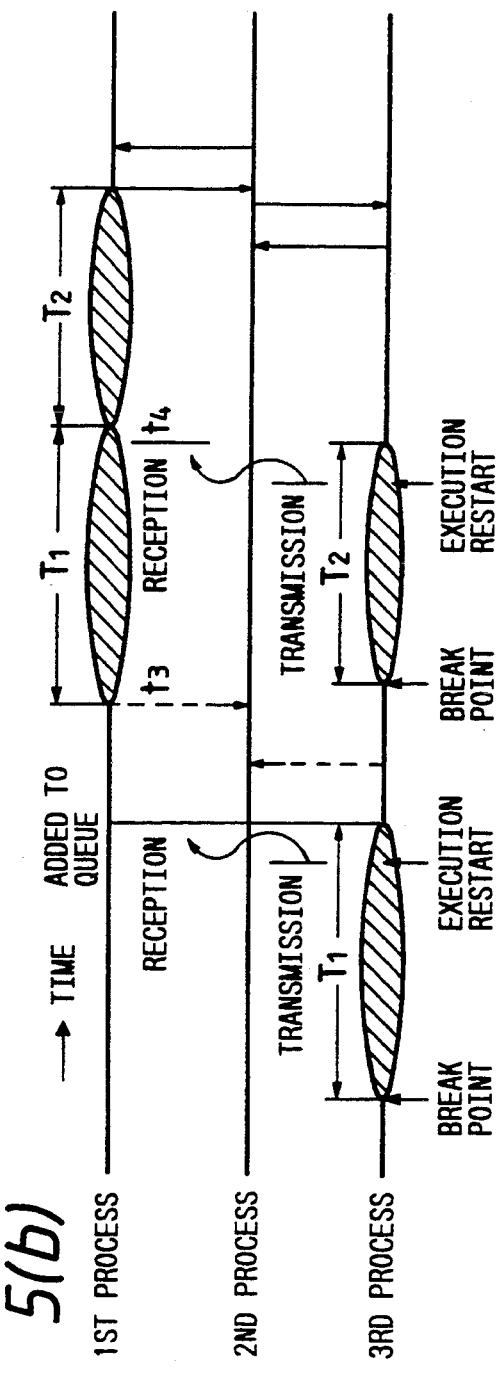
FIG. 5(a)
FIG. 5(b)

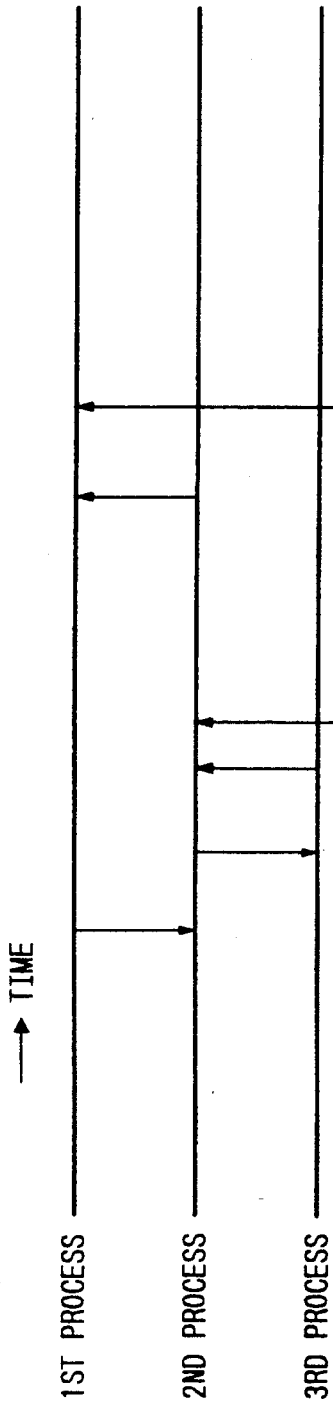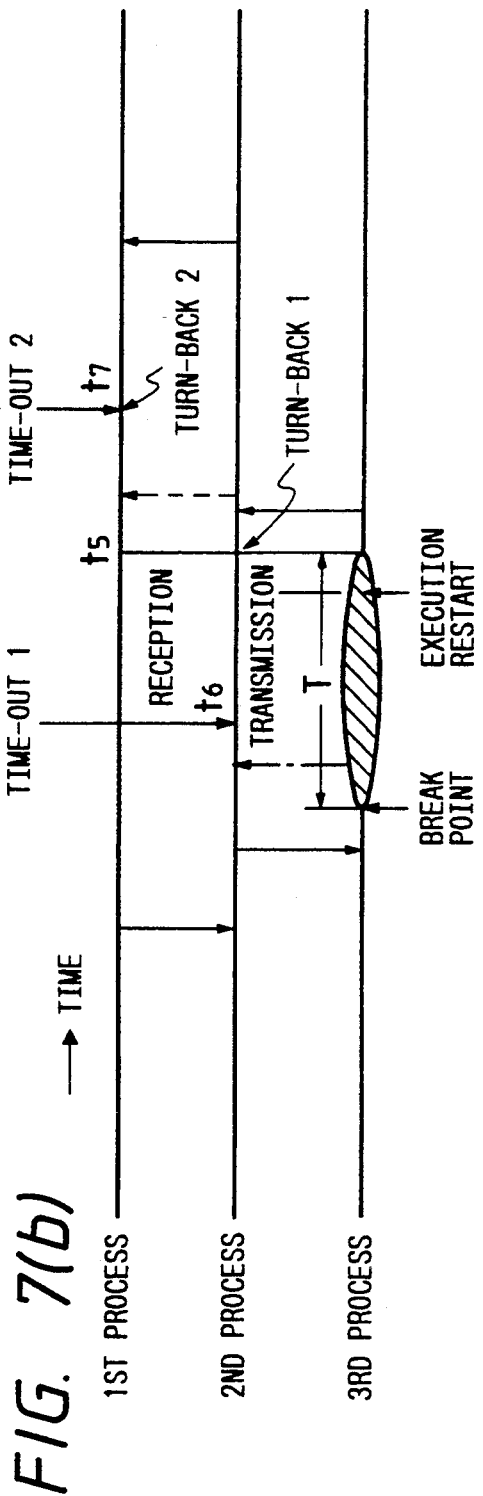

FIG. 9
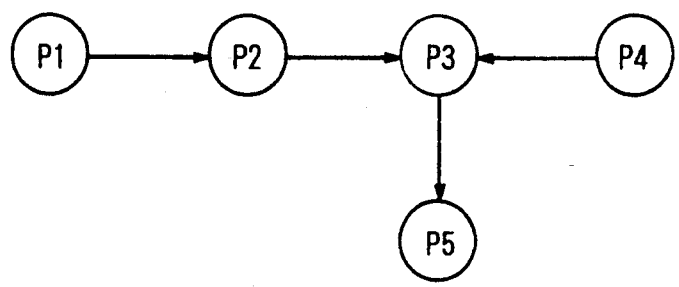
FIG. 10
| | |
|---|---|
| P1 | P1 |
| P2 | P1, P2 |
| P3 | P1, P2, P3, P4 |
| P4 | P4 |
| P5 | P1, P2, P3, P4, P5 |
FIG. 11
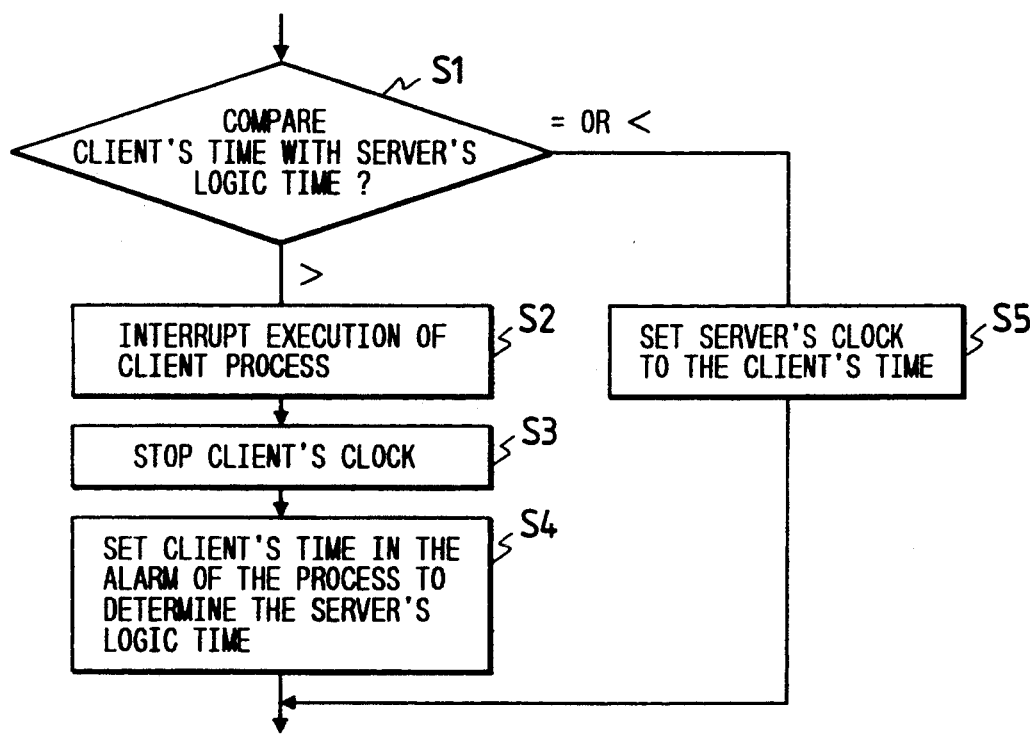

PROGRAM DEBUGGING SYSTEM FOR A DISTRIBUTED DATA PROCESSING SYSTEM

BACKGROUND OF THE INVENTION

1. Field of the Invention

The present invention relates to a distributed data processing system of the type in which a plurality of programs are executed in a distributed state by systematically controlling a plurality of computers. More particularly, the present invention relates to a program debugging system suitable for debugging the processes concurrently and in parallel operating in the distributed data processing system, when those programs are processed in concurrent, parallel or distributed manner.

2. Discussion of the Related Art

Recently in the field of computers, because of the prevalence of communication networks, decreasing costs of computers, and the complicated and varied processing required for computers, programs, each consisting of processes running concurrently and in parallel, operating through communicating means interconnected through communication channels have been described. Particularly, a distributed program consisting of processes, which are distributed in a plurality of computers interconnected in narrow and wide communication networks and that operate concurrently and in parallel, has been written.

In the technical development in this field, emphasis is placed on how to make it easy to describe the processes cooperatively operating in a concurrent/parallel manner and how to make it easy to debug these processes.

A modular programming method has been known as one of the known methods for describing such processes in an easy manner. In the modular programming method, a program is functionally divided into server programs for processing data and client programs for using the results of the processing performed by the server programs. The programs are described for each function.

A method called a remote procedure call (RPC) is known as one of the methods for functionally dividing the program into the server programs and the client programs. For details of the RPC method, reference is made to "Frontiers of Distributed Computing Systems", Nikkei Electronics, Jul. 11, 1990, No. 502, PP. 122–148.

There is known a method of easily debugging the programs. In the debugging method, break points are set at specific positions in the program. During the execution of the program, immediately before an instruction at the break-pointed position is executed, the whole program is interrupted. Parameters in the program are checked or, if incorrect, they are replaced with correct ones. Then, the computer executes again the program from the position of the program where it was interrupted in execution. The debugging method is discussed by M. Linton in his paper "A Debugger for the Berkeley Pascal System", Master's thesis, University of California at Berkeley, June 1981.

In the application of the debugging method to a computing system consisting of concurrent and parallel operating processes, where the RPC is used as a basic communication means, a person attempting to debug sets break points at desired positions in a specific process of the prescribed processes operating concurrently and in parallel, and immediately before an instruction at the break-point is executed, all the concurrent and parallel operating processes to be debugged are interrupted in execution. Then, the person checks the parameters of the process and replaces incorrect parameters with correct ones as in the conventional debugging method for the single process. After the debugging, the execution of all the processes interrupted are restarted. This is discussed by R. Cooper in his paper "Pilgrim: A Debugger for Distributed Systems", Proc. of 7th Int. Conf. on Distributed Computing Systems, PP. 458–465 (September 1987),§5.2 Distributed break pointing in Pilgrim.

In the conventional program debugging systems, efforts have been made placing an emphasis on the development of the technique to quickly interrupt the execution of a plurality of concurrent and parallel operating processes to be debugged, when a process will execute an instruction at the break-pointed position in the computing network using the RPC-basis communication as the basic process-to-process communication. A process-to-process communication means of the broadcasting type, which is capable of communicating with all the related processes in a broadcasting manner, is required to interrupt the execution of the concurrent and parallel operating processes as quickly as possible. In the distributed data processing system, if it is not provided with the broadcasting type process-to-process communication means, the necessary functions cannot be realized in the conventional program debugging system.

SUMMARY OF THE INVENTION

The present invention has been made in view of the above circumstances and has an object to provide a program debugging system for a distributed data processing system consisting of a plurality of concurrent and parallel operating processes which communicate with one another by using a remote-procedure-call means, in which the program debugging system can interrupt and restart the execution of the concurrent and parallel operating processes without the broadcasting type process-to-process communication means, ensuring such a state that the results of the program execution when those processes are interrupted and restarted in execution are the same as the execution results when the processes are not subjected to the interruption/restart process.

In order to accomplish the above object, the present invention provides a program debugging system for a distributed data processing system of the type in which a plurality of processes communicate with one another to realize their concurrent and parallel operations, the debugging system comprising a plurality of satellite debugging means, coupled respectively with the plurality of processes, for debugging the processes; central debugging means for remotely controlling the plurality of satellite debugging means; and remote-procedure-call detecting means for previously detecting an issuance or an end of a remote procedure call in the process to be debugged by the satellite debugging means. In the debugging system, each of the satellite debugging means includes execution interrupting means for interrupting the execution of the process to be debugged and transmitting a message of the execution-interruption to the central debugging means; execution restarting means for restarting the execution of the interrupted process and transmitting a message of the execution-restart to the central debugging means; interruption-time notifying means for calculating an execution-interruption time on the basis of the interruption and restart of the execution of the process and for transmitting the calculated interruption time to the central debugging means; and execution delay means for delaying, when the remote-procedure-call detecting means detects the issuance of a remote procedure call by a process, the execution of the remote procedure call according to information including the execution-interruption time of another process that is transmitted from the central debugging means.

BRIEF DESCRIPTION OF THE DRAWINGS

The accompanying drawings, which are incorporated in and constitute a part of this specification illustrated, embodiments of the invention and, together with the description, serve to explain the objects, advantages and principles of the invention. In the drawings.

FIGS. 4(a) and 4(b) are timing charts for explaining a first operation of the debugging system of the first embodiment;

FIGS. 5(a) and 5(b) are timing charts for explaining a second operation of the same debugging system;

FIGS. 7(a) and 7(b) are timing charts for explaining a fourth operation of the same debugging system;

FIG. 9 is an explanatory diagram for explaining client vs. server relationships among a plurality of processes through the communication based on a remote-procedure-call technique;

FIG. 10 is a table tabulating the relationships of FIG. 9 in the form of the process-to-client;

FIG. 11 is a flow chart showing a control flow for the clock control;

DETAILED DESCRIPTION OF THE PREFERRED EMBODIMENTS

Figure 1:
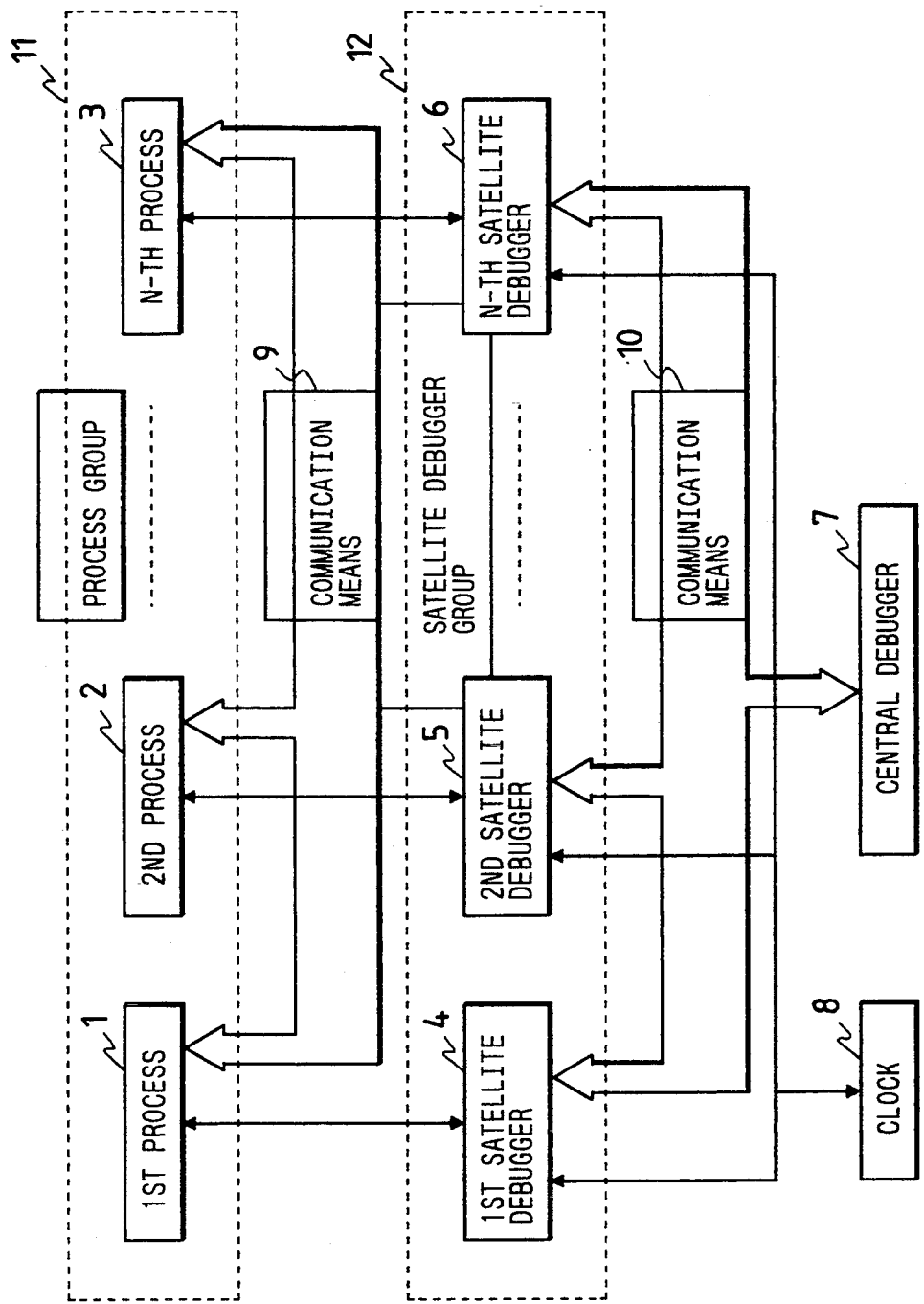
FIG. 1 is a block diagram functionally showing an arrangement of a program debugging system for a distributed data processing system according to a first embodiment of the present invention.

First, the outline of the invention will be described hereinafter.

According to an aspect of the invention, there is provided a program debugging system for a distributed data processing system of the type in which a plurality of processes (1, 2 and 3 in FIG. 1 and 21, 22 and 23 in FIG. 2) communicate with one another to realize their concurrent and parallel operations, the debugging system comprising: a plurality of satellite debugging means (4, 5 and 6 in FIG. 1 and 24, 25 and 26 in FIG. 2), coupled respectively with the plurality of processes, for debugging the processes; central debugging means (7 in FIG. 1, 27 in FIG. 2, and FIG. 3) for remotely controlling the plurality of satellite debugging means; and remote-procedure-call detecting means (247,257 and 267 in FIG. 2) for previously detecting the issuance, the end or the time-out of a remote procedure call in the process to be debugged by the satellite debugging means.

In the program debugging system thus arranged, each satellite debugging means includes execution interrupting means (241,251 and 261 in FIG. 2) for interrupting the execution the process to be debugged and transmitting a message of the interruption to the central debugging means, execution restart means (243,253 and 263 in FIG. 2) for restarting the execution of the interrupted process and transmitting a message of the restart to the central debugging means, interruption-time notifying means (244, 254 and 264 in FIG. 2) for calculating the interruption time on the basis of the interruption and restart of the execution of the process and for transmitting the calculated interruption time to the central debugging means, and execution delay means (245, 246, 255, 256, 265 and 266 in FIG. 2) for delaying, when the remote-procedure-call detecting means detects the issuance of a remote procedure call by a process, the execution of the remote procedure call according to information including the interruption time of another process that is transmitted from the central debugging means.

According to another aspect of the invention, there is provided a program debugging system for a distributed data processing system of the type in which a plurality of processes communicate with one another to realize their concurrent and parallel operations, the debugging system comprising: a plurality of satellite debugging means (84, 85 and 86 in FIG. 8), coupled respectively with the plurality of processes, for debugging the processes; and central debugging means (87 in FIG. 8) for remotely controlling the plurality of satellite debugging means.

The central debugging means includes remote-procedure-call detecting means (871, 872 and 873 in FIG. 8) for previously detecting the issuance, the end or the time-out of a remote procedure call in the process to be debugged by the satellite debugging means, and time managing means (876 in FIG. 8) functioning such that when the remote-procedure-call detecting means detects the issuance, the end or the time-out of a remote procedure call, the time managing means adjusts time of a clocking means of the process associated with the remote procedure call.

Each satellite debugging means includes clocking means (88, 89 and 90 in FIG. 8) associated with the plurality of processes to be debugged, execution interrupting means (841, 851 and 861 in FIG. 8) for interrupting the execution of the process to be debugged by the satellite debugging means and for stopping the clocking means associated with the process, and execution restart means (842, 852 and 862 in FIG. 8) for restarting the execution of the interrupted process and the operation of the clocking means associated with the process as well.

The time managing means is arranged so as to adjust the time of the clocking means of each satellite debugging means to be equal to the time of the clocking means having the longest time the clocking means is stopped of those clocking means which are stopped by the execution interrupting means and restarted by the execution restart means.

Hereinafter, a first embodiment of the invention will be described.

FIG. 1 is a block diagram functionally showing an arrangement of a program debugging system for a distributed data processing system according to the first embodiment of the invention.

In FIG. 1, the program debugging system, which includes a group of satellite debuggers 12, a clock 8, and a central debugger 7, is coupled with the distributed data processing system including a group of processors 11, by means of a suitable communication means 9. The satellite debugger group 12 is coupled with the central debugger 7 by means of a suitable communication means 10. The processor group 11 consists of a plurality of processes; a first process 1, a second process 2, ..., an n-th process 3. Those processes 1, 2 and 3 operate concurrently and in parallel, while communicating with one another. The satellite debugger group 12 consists of a plurality of satellite debuggers; a first satellite debugger 4, a second satellite debugger 5, ..., an nth satellite debugger 6. Those debuggers 4, 5 and 6 are respectively coupled with the processes 1, 2, and 3. Each debugger debugs the process coupled therewith. The central debugger 7 remotely controls the operations of the respective satellite debuggers 4, 5 and 6. The clock 8 is used when the satellite debuggers 4, 5 and 6, and the central debugger 7 refer to time.

Figure 2:
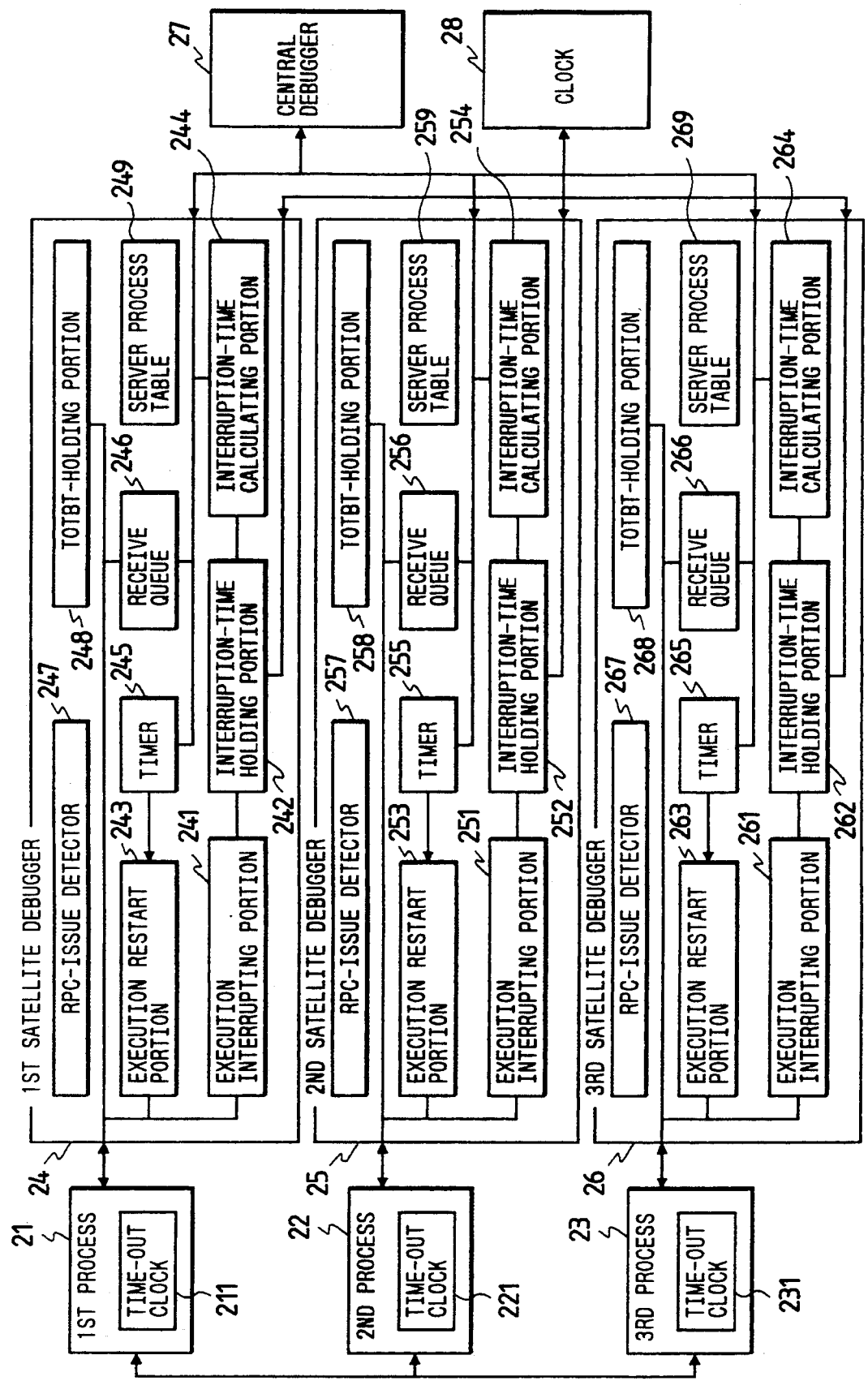
FIG. 2 is a block diagram showing the more detailed arrangement of the debugging system shown in FIG. 1.

The program debugging system shown in FIG. 1 is illustrated in more detail in FIG. 2, in connection with a distributed data processing system. As shown, in the distributed data processing system with which the debugging system of the invention is coupled, three processes, first to third processes 21, 22 and 23, are used, for simplicity. Accordingly, the debugging system contains three debuggers, first to third satellite debuggers 24, 25 and 26, which are respectively coupled with the first to third processors 21, 22 and 23 and debug the corresponding processors. Also in the distributed data processing system, those processors 21, 22 and 23 communicate with one another to realize the concurrent and parallel operations. A central debugger 27, coupled with the satellite debuggers 24, 25 and 26, remotely controls the operations of those debuggers. A clock 28, additionally provided, is used when the satellite debuggers 24, 25 and 26, and the central debugger 27 refer to time.

The arrangements of the satellite debuggers 24 to 26 will be described. For ease of explanation, the satellite debugger 24 will be typically described since those debuggers 24 to 26 are the same in arrangement.

The satellite debugger 24 is made up of an execution interrupting portion 241, an interruption-time holding portion 242, an execution restart portion 243, an interruption-time calculating portion 244, a timer 245, a receive queue 246, a remote-procedure-call (RPC) issue detector 247, a time-out-turn-back-time (TOTBT) holding portion 248, and a process-to-server-process table 249.

The execution interrupting portion 241 interrupts the execution of the processors 21, 22 and 23, which are respectively coupled with the satellite debuggers 24, 25 and 26, immediately before the process will execute an instruction at the position of the processor to be debugged where one of break points is already set. The interruption-time holding portion 242 holds the time on which the execution of the processes is interrupted. The execution restart portion 243 functions to restart the execution of the processes which have been interrupted in execution. The interruption-time calculating portion 244, when the program execution is restarted, calculates the interruption time by using the data output from the interruption-time holding portion 242 and the clock 28. The timer 245, in combination with the execution interrupting portion 241 and the execution restart portion 243, is used to interrupt the execution of the processes coupled with the satellite debugger 24 at a desired time. The receive queue 246 holds interruption-time data transferred from the central debugger 27 in an FIFO (first-in first-out) manner. The RPC-issue detector 247 detects the issuance of a remote procedure call immediately before it is issued in the process being debugged by the satellite debugger 24. When a remote procedure call is issued and a return value, which will be generated in response to the generated remote procedure call, is not obtained within a prescribed period of time, that is, when a time-out occurs, a time-out clock associated with the satellite debugger under discussion is turned back on the presumption that the time-out did not occur. The TOTBT-holding portion 248 holds the turn-back time of the time-out clock. For the process being debugged, the process-to-server-process table 249 accepts, for every process issuing a remote procedure call, a remote procedure call from the process, and holds the data identifying the process which executes the remote procedure.

Figure 3:
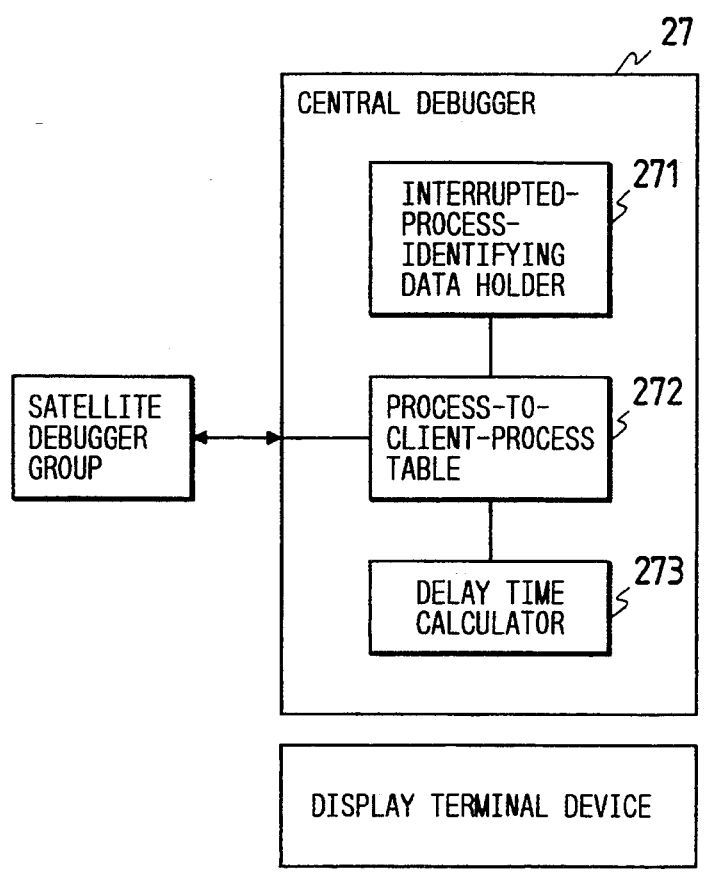
FIG. 3 is a block diagram showing an arrangement of a central debugger of the debugging system of the first embodiment.

The details of the central debugger 27 are shown in FIG. 3, in block form. As shown, the central debugger 27 includes an interrupted-process-identifying data holder 271 and a process-to-client-process table 272. The interrupted-process-identifying data holder 271 receives the identifying data for identifying the process interrupted by one of the satellite debuggers 24, 25 and 26 from that satellite debugger, and holds the identifying data. For the process being debugged, the process-to-client-process table 272 holds, for every process to execute a remote procedure, the identifying data of the process issuing a remote procedure call toward the remote-procedure executing process.

The central debugger 27 further includes a delay time calculator 273, which estimates a time necessary for transmitting the interrupting instructions to the satellite debuggers, and adds it to the interruption time from a satellite debugger. The result of addition is used as a delay time caused by the execution interruption. The central debugger 27 sends the delay time (and an interrupting instruction) to other satellite debuggers than the satellite debugger that has sent the interruption time, in a predetermined order.

FIG. 9 is an explanatory diagram showing an example of the client process vs. server process relationship among processes P1 to P5 through the remote-procedure-call based on communication. FIG. 10 shows a process-to-client-process table tabulating the above relationship.

Known suitable communication means, not referred to here, may be used for the communications among the processes, satellite debuggers, and between the central debugger and the satellite debuggers.

The operation of the thus arranged program debugging system will be described.

The operation to be exemplarily given is as follows: during the execution of the first process (referred to as a client process) 21 as one client process being debugged by the first satellite debugger 24, in a computer in which the second process (server process) 22 as a server process including a remote procedure, a remote procedure call is issued and sent to the server process 22 being debugged by the second satellite debugger 25, and during the execution of the third process (client process) 23 as one client process being debugged by the third satellite debugger 26, a remote procedure call is issued and transmitted to the server process 22.

It is assumed that the process including a remote procedure executes only the remote procedure.

An operator attempting to debug enters an instruction from the central debugger 27 and sets a break point in a process, for example, the client process 23. When the execution of the server process 22 is interrupted, the client process 21 or the client process 23 explains the remote procedure call not being issued to the server process 22.

When the third satellite debugger 26 detects that the process will execute an instruction in the client process 23 where a break point has been already set, the execution interrupting portion 261 interrupts the execution of the client process 23 and sends to the central debugger 27 a message that the execution of the client process 23 has been interrupted. The central debugger 27 then stores data representative of the execution interruption in the interrupted-process-identifying data holder 271 provided therein. At this time, the central debugger 27 does not control the interruption of executing the remaining processes 21 and 22 both operating in a concurrent/parallel mode.

The RPC-issue detector may be realized by any suitable known method. In one of the known methods, a break point is previously set in a remote-procedure-call drive library so that when a remote procedure call is driven, the control is transferred to the satellite debugger.

When the debugging operation progresses, and the operator to debug instructs the third satellite debugger 26 to restart the interrupted client process 23, the interruption time is calculated by the interruption-time calculating portion 264, and the calculated interruption time is transferred to the central debugger 27.

Then, the central debugger 27 looks up the number of the satellite debuggers coupled therewith in the process-to-client-process table 272, calculates a restart-instruction transmitting time required for completing the transmission of an execution-restart instruction, interrupted-process identifying data, and interruption time to all the satellite debuggers, and transmits an execution-restart instruction, interrupted-process identifying data, and the sum T of the interruption time and the calculated restart-instruction transmitting time to all of the satellite debuggers. Afterwards, the central debugger 27 erases the data stored in the interrupted-process-identifying data holder 271 and is ready for the next execution interruption.

The aforementioned data may be transmitted to the satellite debuggers as called parties appropriately ordered, in a one-to-one or a one-to-plurality manner, not using the broadcasting type communication. If necessary, the data may be simultaneously transmitted to the satellite debuggers by using the broadcasting type communication.

The sum T of the interruption time and the restart-instruction transmitting time, which are transmitted to all of the satellite debuggers, may be replaced by the result of adding the present time or a constant to or subtracting it from the sum T of the interruption time and the restart-instruction transmitting time.

In the satellite debuggers 24, 25 and 26, which receive the execution-restart instruction, interrupted-process identifying data, and the sum T of the interruption time and the restart-instruction transmitting time, if they are not executing the remote procedure call at the time (t2 in FIG. 4(b)) of receiving them, the sum T of the interruption time and the restart-instruction transmitting time is additionally used as the last data of the receive queues 246, 256 and 266 contained in the satellite debuggers 24, 25 and 26.

The operation of the debugging system when a satellite debugger is instructed to interrupt the execution of the processes 21, 22 and 23 coupled with the satellite debuggers 24, 25 and 26 in order to keep the order of remote procedure calls, will be described.

The following steps (a) and (b) of operations are repeated by each of the satellite debuggers 24, 25 and 26.

(a) The contents of the receive queues 246, 256 and 266 in the satellite debuggers 24, 25 and 26 are checked. If the receive queue 246, for example, is empty, the satellite debugger transfers to the central debugger 27 a message that the execution of the process coupled with the empty receive queue starts again, actually starts the interrupted execution of the process, and ends the repetitive operation of the steps (a) and (b). The central debugger 27 receives the execution restart message, and erases the data on the designated process retained in the interrupted-process-identifying data holder 271.

(b) The satellite debugger reads the sums of the interruption time and the restart-instruction transmitting time (T in FIG. 4(b)) from the receive queues 246, 256 and 266 in the order of receiving them, totals the sums S, and adds the total value to the contents of the interruption-time holding portions 242, 256 and 266, whereby obtaining execution restart times, sets the execution restart times in the timers 245, 255, 265, and waits for the next operation in a state that the execution of the processes 21, 22 and 23 are suspended.

The operation of the debugging system when the execution of the processes 21, 22 and 23 coupled with the satellite debuggers 24, 25 and 26 progresses and a client process issues and sends a remote procedure call to a server process, the execution of the server process, if required, is interrupted in order to keep the order of remote procedure calls, will be described.

It is assumed that the client process 21 coupled with the satellite debugger 24 progresses in execution, and when the RPC-issue detector 247 detects the fact that a remote procedure call will be issued to the server process 22 at time t1 in FIG. 4(b). Upon the detection, the satellite debugger 24 erases the content of the TOTBT-holding portion 248, and at the same time sends to the central debugger 27 a message that a remote procedure call will be issued to the server process 22.

In response to the message, the central debugger 27 looks up the content of the interrupted-process-identifying data holder 271. If the server process 22 as a called party for the remote procedure call has been interrupted in execution, the central debugger 27 sends to the satellite debugger 24 a message that there is a process of which the execution is interrupted in connection with the first process 21 as the client process.

If the interruption of the server process 22 is not found in the interrupted-process-identifying data holder 271, the central debugger 27 looks it up in the process-to-client-process table 272 to check as to whether or not any of the client processes for the server process 22 is stored in the interrupted-process-identifying data holder 271, that is, whether or not there is a client process of which the execution is interrupted (in the example of FIG. 4(b), the client process of which the execution is interrupted, i.e., the third process).

In this way, the central debugger 27 repeatedly refers to the process-to-client-process table 272 while starting with the server process 22, whereby to look up all possible client processes. If there is a client process interrupted in execution, the central debugger 27 returns to the satellite debugger 24 an answer that there is an execution-interrupted process in connection with the client process 21.

When receiving the answer that there is an execution-interrupted process in connection with the client process 21, the satellite debugger 24 interrupts the execution of the client process 21 immediately before a remote procedure call is generated, and sends to the central debugger 27 a message that the execution of the client process 21 has been interrupted. When receiving the message, the central debugger 27 stores it in the interrupted-process-identifying data holder 271.

When the satellite debugger 24 knows that there is no process of which the execution is interrupted in connection with the client process 21, it checks the content of the receive queue 246. If the receive queue is empty, it will not take any action. As a result, the client process 21 generates a remote procedure call and continues its execution.

If there is no process of which the execution is interrupted in connection with the client process 21 and the receive queue 246 is not empty (the first process in FIG. 5(b)), the satellite debugger 24 interrupts the execution of the client process 21 immediately before a remote procedure call is issued (at time t3 in FIG. 5(b)), and sends the execution interruption of the client process 21 to the central debugger 27. Then, the central debugger 27 records information of the execution interruption in the interrupted-process-identifying data holder 271. Then, the steps (a) and (b) are repeated. In the example of FIG. 5(b), a delay time T2 caused by the interruption and the execution restart of the third process is received again at time t4. Therefore, the steps (a) and (b) are repeated two times in the order of (a) and (b), and (a) and (b).

The operation of the debugging system in which when the execution of the server process 22 is interrupted, the client process 21 is issuing a remote procedure call to the server process 22, will be described.

The operation of the second satellite debugger 25 is the same as that thus far described.

A case where before in response to the remote procedure call, the client process 21 receives a return value from the server process 22, a time-out clock 211 of the client process 21 detects the time being up, and generates a time-out, will be used for explaining the operation of the satellite debugger 24. No processing in particular will be performed when no time-out is generated.

An instruction to restart the process execution, and the sum T of the interruption time and the restart-instruction transmitting time, that are transmitted from the central debugger 27, are received by any of the satellite debuggers 24, 25 and 26.

At this time, if the process coupled with each satellite debugger is executing the remote procedure call, and if the process, which is coupled with the debugger having transmitted the execution-restart instruction and the sum T of the interruption time and the restart-instruction transmitting time, is coincident with any of the processes obtained when the satellite debuggers refer to the process-to-server-process tables 249,259 and 269, with a key of the process coupled with the satellite debugger having received the above data, is coincident with any of the processes gained when the satellite debuggers refer to the process-to-server-process tables 249, 259 and 269, with a new key of the process resulting from referring to the process-to-server-process tables 249, 259 and 269, it stores in the TOTBT-holding portions 248, 258 and 268 the sum of the interruption time and the restart-instruction transmitting time which were received. If it is not coincident, the sum of the interruption time and the restart-instruction transmitting time is additionally applied as the last data to the receive queues 246, 256 and 266 of the satellite debuggers 24, 25 and 26.

When a time-out occurs, the satellite debugger 24 does not execute the time-out processing, and interrupts the execution of the client process 21. Then, it checks the content of the TOTBT-holding portion 248. If the time-out turn-back-time is recorded therein, it turns back the time-out clock 211 by a time-out turn-back time stored in the TOTBT-holding portion 248, and restarts the process execution.

Then, it checks the content of the TOTBT-holding portion 248, and if the time-out turn-back-time is recorded therein, the satellite debugger 24 asks the central debugger 27 whether there is a process of which the execution is interrupted in connection with the client process 21. If the answer is yes, that is, a process exists of which the execution is interrupted, the satellite debugger 24 waits till it will receive the execution-restart instruction and the sum T of the interruption time and the restart-instruction transmitting time. If there is not such a process, it allows the client process 21 to continue its execution, so that the client process 21 executes the time-out processing.

As described above, in the network system of the server processes and client processes, the program debugging system of the present embodiment properly controls the interruption of the execution of the processes running in a concurrent/parallel mode, without changing the order of process-to-process communications based on the remote procedure call and without using a process-to-process communication portion of the broadcasting type. Thus, in the network system not having the broadcasting type process-to-process communication portion, a person to debug can use a suitable debugging method in which if the program is interrupted during the debugging operation, the result of the program execution remains unchanged.

Other specific operations than the operation as mentioned above will be described. FIGS. 4(a) through 7(b) show timing charts graphically illustrating the operations to follow. Arrows of broken lines in the figures indicate points where remote procedure calls will occur if the execution is not interrupted at the break points.

In the operation of the program debugging system shown in FIG. 4(a), the client process 23 issues and sends a remote procedure call to the server process 22, and then the client process 21 issues and sends a remote procedure call to the server process 22. Thereafter, the client process 23 issues again a remote procedure call toward the server process 22. In this example of operation, no break point is set in the program.

In the operation of FIG. 4(b), in a situation that after the client process 23 issues a remote procedure call toward the server process 22 but the client process 21 issues and sends a remote procedure call to the server process 22, the client process 23 will execute the instruction at the position where a break point is set.

As shown in FIG. 4(b), after the third process (client process) 23 sends a remote procedure call to the second process (server process) 22 but before the first process 21 sends a remote procedure call to the second process 22, the third process 23 will execute the instruction at the break-pointed position, and its execution is interrupted.

At this time, the third satellite debugger 26 coupled with the client process 23 sends to the central debugger 27 a message that the client process 23 was interrupted. Then, at time t1, the client process 21 will issue and send a remote procedure call to the server process 22 and the RPC-issue detector 247 detects it. Upon the detection, the satellite debugger 24 asks the central debugger 27 whether there is a process execution-interrupted in connection with the client process 21.

The central debugger 27 looks up the second process 22 as a server process for the client process 21 in the process-to-client-process table 272. In this case, the client process 21 and the client process 23 have been stored. Then, it checks whether or not the execution-interrupted process is retained in the interrupted-process-identifying data holder 271. The result of check shows that the client process 23 has been retained therein. On the basis of the facts, the central debugger 27 returns to the satellite debugger 24 a message that the process associated with the client process 21 has been interrupted. When receiving the answer, the satellite debugger 24 interrupts the execution of the client process 21.

As shown in FIG. 4(b), the client process 23 receives the instruction of the execution-restart, and the interruption-time calculating portion 264 of the third satellite debugger 26 calculates the interruption time and sends the execution-restart instruction and the interruption time of the client process 23 to the central debugger 27. The delay time calculator 273 of the central debugger 27 estimates a time necessary for transmitting the restart instruction to all the satellite debuggers and adds it to the interruption time. The result of addition is used as a delay time T.

The central debugger 27 sends the restart instruction and the delay time T to all the satellite debuggers in a predetermined order.

Every time the central debugger 27 sends the restart instruction and the delay time T to all the satellite debuggers, when each satellite debugger receives the restart instruction and the delay time T, the central debugger 27 checks if the process coupled with the satellite debugger is retained in the interrupted-process-identifying data holder 271, and if it is retained, erases it in the identifying holder.

The satellite debugger 26 restarts the execution of the third process 23 at time t2 that the delay time T is received and it is equal to the interruption time, and the client process 23 restarts its execution.

After the satellite debugger 24 receives the restart instruction and the delay time T at time t2 sit waits for a time required for the interruption time of the first process 21 to be exactly equal to the delay time T ((t2−t1) time after time t2) using the timer 245. As a result, subsequent to the interruption of the third process 23, the order of the process-to-process communications among the first to third processes 21, 22 and 23 remains unchanged. Accordingly, the operation of the whole program is equivalent to that shown in FIG. 4(a) where the third process 23 is not interrupted. This indicates that the results of the execution of the program are also left unchanged.

If the client process 21 receives the restart instruction at any time between time t1 and time (t1+T), the timing of restarting the execution of the first process 21 is unchanged. Accordingly, the central debugger 27 can transmit the restart instruction in a one-to-one communication manner to every satellite debugger without using the broadcasting communication. It is evident that the interrupting instruction may be transmitted by the broadcast communication, if required.

FIGS. 5(a) and 5(b) are timing charts showing another operation of the debugging system of the present embodiment. In the operation, as shown in FIG. 5(a), the third process 23 issues and sends a remote procedure call to the second process 22, and then the first process 21 issues a remote procedure call toward the second process 22.

When, as shown in FIG. 5(b), before the third process 23 sends a remote procedure call to the second process 22, the third process 23 will execute the instruction at the break-pointed position, the execution of the instruction is interrupted.

At this time, the third satellite debugger 26 coupled with the third process 23 sends the interruption of the third process 23 to the central debugger 27.

When the execution of the third process 23 is restarted before the first process 21 sends a remote procedure call to the second process 22, the satellite debugger sends the execution-restart of the third process 23 and the interruption time to the central debugger 27. Then, the central debugger 27 determines the delay time T1, and sends the restart instruction and the delay time T1 to all the satellite debuggers.

When the satellite debugger 24 receives the restart instruction and the delay time T1, the execution is not yet interrupted and hence the delay time T1 is stored in the receive queue 246.

Thereafter, in the satellite debugger, the issuance of a remote procedure call to the first process 21 is detected, and the content of the receive queue 246 is checked. In this case, the receive queue 246 is not empty, and then the satellite debugger 24 interrupts the execution of the first process 21 and waits for the delay time T1.

Thereafter, a break point is reached again in the third process 23, and as in the case where the previous break point is reached, the central debugger 27 sends a restart instruction and a delay time T2, according to the instruction by a person to debug.

The satellite debugger 24 defers the issuance of a remote procedure call to the second process 22 for the delay time T1, and checks again the content of the receive queue 246. Then, the satellite debugger 24 waits for the delay time T2.

Afterwards, the satellite debugger 24 waits for the delay time T2, knows that the receive queue 246 is empty, and restarts the execution of the first process 21. As a result, the first process 21 sends a remote procedure call to the second process 22.

Also in the instant operation as state above, the relationship of the process-to-process communication among the first, second, and third processes 21, 22 and 23 is the same as that of the case of FIG. 5(a). The operation of the whole program is equivalent to that of the case shown in FIG. 5(a) where the third process 23 is not interrupted. Accordingly, the result of executing the program is the same as that of the case of FIG. 5(a). Also in the instant operation of the debugging system, a person attempting to debug may interrupt and restart the execution of the program without changing the operation of the program. For the same reason as that in the operation shown in FIGS. 4(a) and 4(b), the central debugger 27 may transmit the restart instruction in one-to-one communication manner to every satellite debugger without using the broadcasting communication. Of course, the restart instruction may be transmitted by the broadcast communication, if required.

Figure 6A:
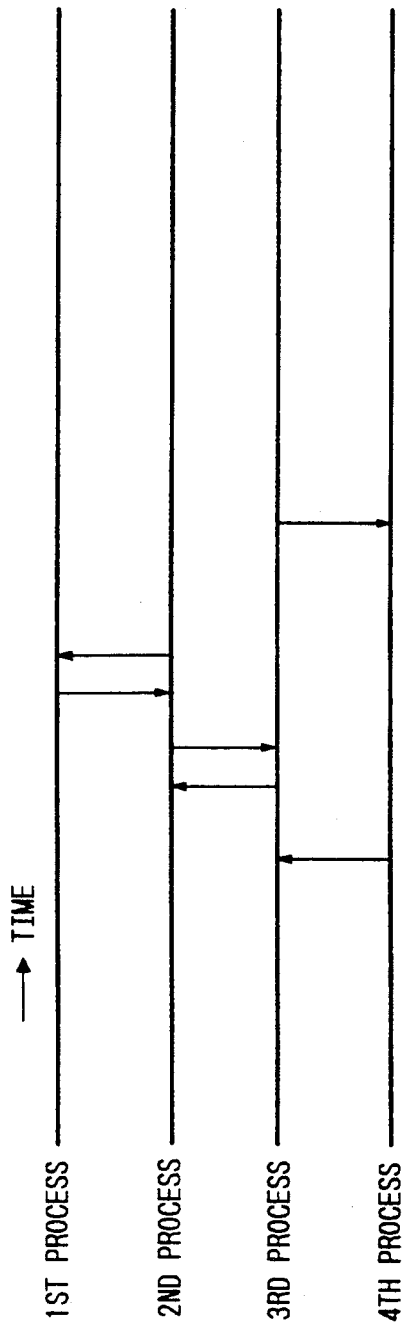
FIGS. 6(a) and 6(b) are timing charts for explaining a third operation of the same debugging system.
Figure 6B:
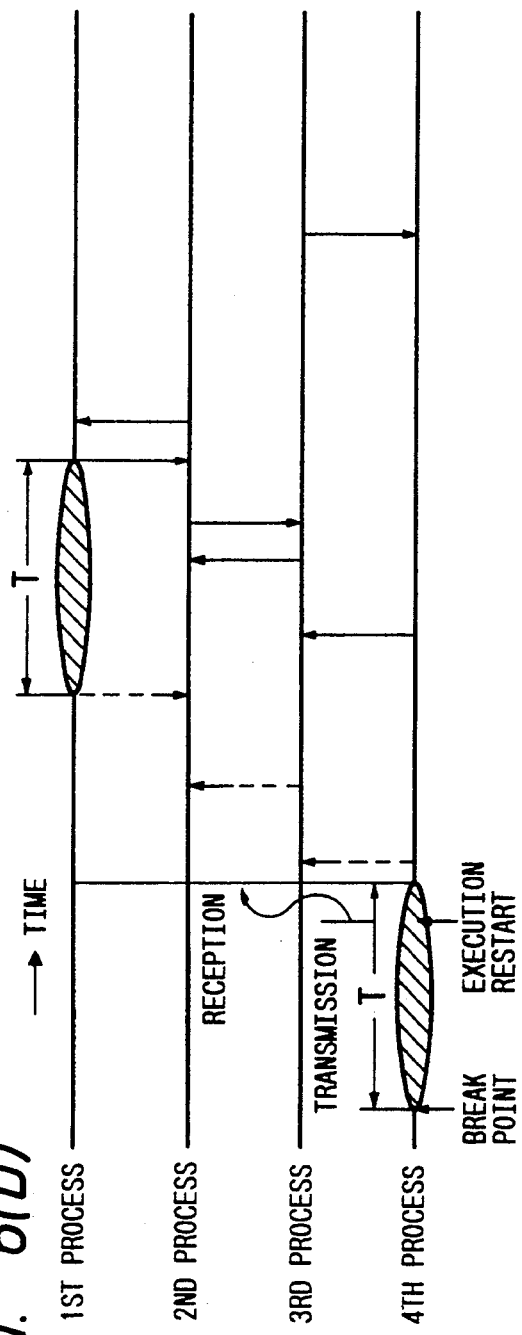

FIGS. 6(a) and 6(b) are timing charts showing still another operation of the debugging system according to the embodiment.

In this instance, as shown in FIG. 6(a), a fourth process (not shown in FIG. 2) issues and sends a remote procedure call to the third process. Before the third process 23 sends a return value to the fourth process, the third process 23 sends a remote procedure call to the second process 22 and then the first process 21 sends a remote procedure call to the second process 22.

As shown in FIG. 6(b), before the fourth process sends a remote procedure call to the third process 23, the fourth process will execute an instruction at the position where a break point is set. However, the execution of the instruction is interrupted.

At this time, a fourth satellite debugger (not shown in FIG. 2) coupled with the fourth process sends the execution-interruption to the central debugger 27.

When the fourth process is restarted in execution before the first process 21 sends a remote procedure call to the second process 22, the execution-restart of the fourth process and the interruption time are sent to the central debugger 27, as in the operation shown in FIGS. 4(a) and 4(b). Then, the central debugger 27 determines a delay time T and sends an execution-restart instruction and the delay time T to all the satellite debuggers.

When the first satellite debugger 24 receives the execution-restart instruction and the delay time T, the execution of the first process 21 is not yet interrupted. Accordingly, the delay time T is stored in the receive queue 246 of the first satellite debugger 24.

Thereafter, in the first satellite debugger 24, the issuance of a remote procedure call to the first process 21 is detected, and the content of the receive queue 246 is checked. In this case, the receive queue 246 is not empty. Accordingly, the first satellite debugger 24 interrupts the execution of the first process and waits for the delay time T. The second process 22 and the third process 23 each receive the execution-restart instruction and the delay time T. Since the fourth process serves as a server process for them, no data is stored in the receive queue and it will exercise no influence on the subsequent operations.

FIG. 7(a) is a timing chart showing the position of a time-out 1 for a remote procedure call from the second process 22 to the third process 23, and the position of a time-out 2 for a remote procedure call from the first process 21 to the second process 22. When a return value to the remote procedure call from the second process 22 arrives late the first process 21, the time-out clock 211 detects the time being up, and generates a time-out 1. However, it can receive the return value before the time-out 1 is generated, if the operation is properly performed.

The execution of the third process 23 is interrupted owing to the remote procedure call, a return value arrives later, and the time-out 1 is generated. When it is detected, the first satellite debugger 24 does not execute the time-out processing and interrupts the execution of the client process 21. Then, it checks the content of the TOTBT-holding portion 248. If the time-out turn-back time is stored therein (corresponding to the time-out 2 generated at time t7 after the restart instruction at time t5 and the delay time T are received in FIG. 7(b)), it turns back the time-out clock 211 by the time-out turn-back time stored in the TOTBT-holding portion 248, and restarts the execution of the program.

When the content of the TOTBT-holding portion 248 is checked and the time-out turn-back time is not stored in the TOTBT-holding portion 248 (corresponding to the time-out 1 generated at time t6 after the restart instruction at time t5 is received in FIG. 7(b)), the first satellite debugger 24 asks the central debugger 27 whether there is a process being interrupted in execution in connection with the client process 21. In this case, there is such a process (in this instance, the third process 23) the first satellite debugger 24 waits till it receives the execution-restart instruction, and the sum of the interruption time and the restart-instruction transmitting time.

In the program debugging system of the first embodiment thus far mentioned, when the execution-interrupting operations and the execution-restart operations are concurrently performed in the plurality of processes, the issuance of a remote-procedure-call to other processes is delayed by the time corresponding to the total sum of the interruption times. For this reason, sometimes the execution of the whole system is excessively delayed in the first embodiment. The second embodiment of the invention successfully solves the excessive delay problem of the first embodiment.

Figure 8:
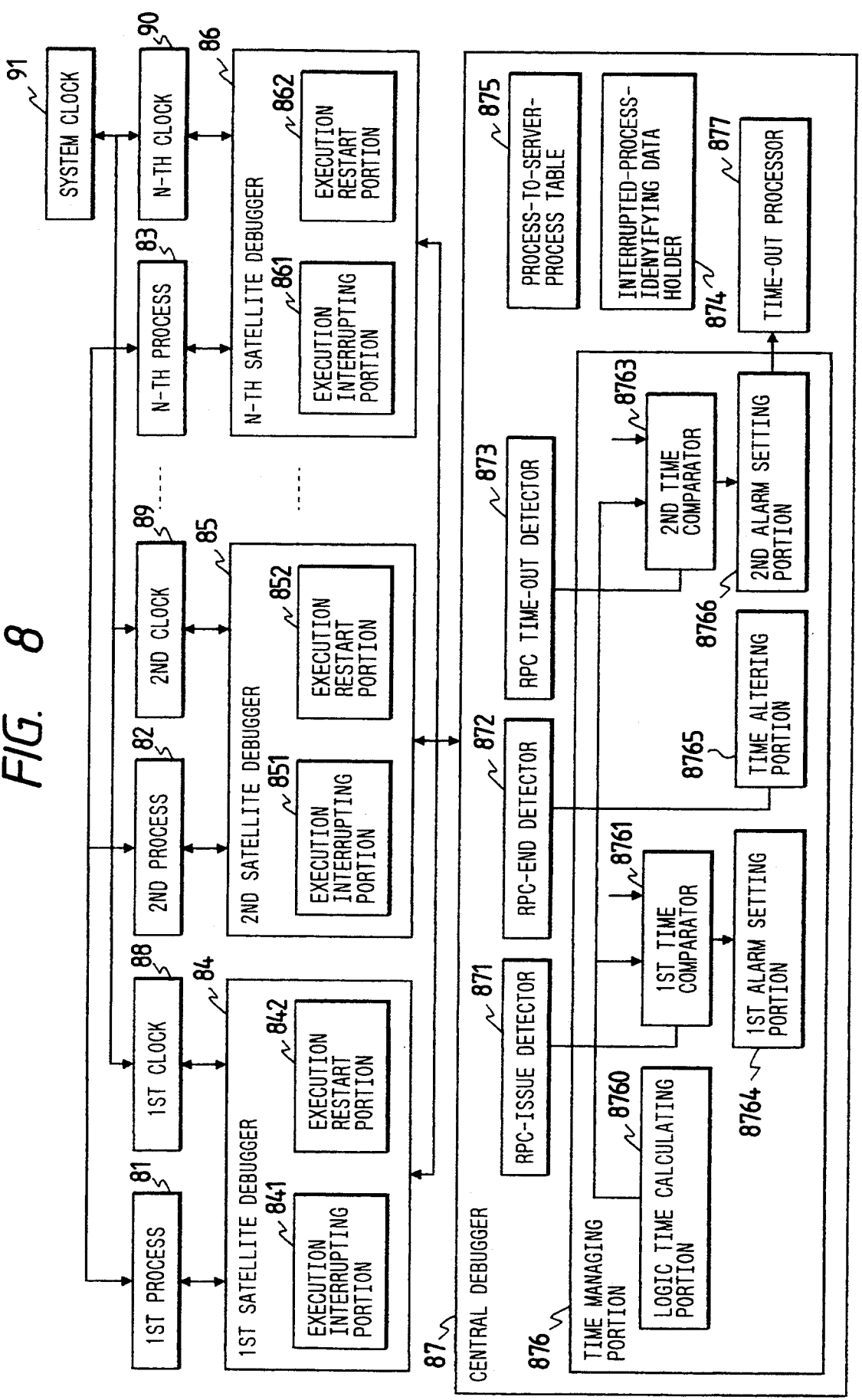
FIG. 8 is a block diagram functionally showing an arrangement of a program debugging system for a distributed data processing system according to a second embodiment of the present invention.

FIG. 8 is a block diagram showing an arrangement of the program debugging system according to the second embodiment of the invention.

As shown, the program debugging system is also used for a distributed data processing system which includes a plurality of processes, a first process 81, a second process 82, . . . , an n-th process 83, which operate concurrently and in parallel while communicating with one another. The debugging system includes a plurality of satellite debuggers, a first satellite debugger 84, a second satellite debugger 85, . . . , an n-th satellite debugger 86, which are respectively coupled with the first to n-th processes 81, 82 and 83, and a central debugger 87 for remotely controlling the operations of the satellite debuggers 84, 85 and 86. A plurality of clocks, a first clock 88, a second clock 89, . . . , an n-th clock 90 are further provided. Those clocks are referred to for the times of the processes coupled with the satellite debuggers 84, 85 and 86, and are used for setting the execution of those processes. A system clock 91 as a standard clock in the system is additionally provided, which synchronizes the first to n-th clocks 88 to 90 with one another.

A plurality of alarms, when times and process identifiers are properly combined, may be set in those clocks 88, 89 and 90.

The first satellite debugger 84 includes an execution interrupting portion 841 and an execution restart portion 842. The execution interrupting portion 841 interrupts the execution of the process to be debugged and transmits a message of the execution-interruption to the central debugger 87. The execution-restart portion 842 restarts the execution of the interrupted process and transmits a message of the execution-restart to the central debugger 27. The remaining satellite debuggers 85 and 86 each has the same construction as that of the first satellite debugger 84.

The central debugger 87 includes a remote-procedure-call (RPC) issue detector 871, an RPC-end detector 872, and an RPC time-out detector 873. The RPC-issue detector 871 detects the issuance of a remote procedure call before it is issued, for each process. Immediately before the remote procedure call ends in each of the processes to be debugged by the first to n-th satellite debuggers 84 to 86, the RPC-end detector 872 detects the end of the remote procedure call. Immediately before the time-out of the remote procedure call occurs in each process to be debugged by the corresponding satellite debugger 84, 85 or 86, the RPC time-out detector 873 detects the time-out of the remote procedure call.

The central debugger 87 further includes an interrupted-process-identifying data holder 874, and a process-to-server-process table 875. The interrupted-process-identifying data holder 874 receives the identifying data for identifying the process interrupted by one of the satellite debuggers 84, 85 and 86 from that satellite debugger, and holds the identifying data therein. For the process being debugged, the process-to-server-process table 875 accepts, for every process issuing a remote procedure call, a remote procedure call from the process, and holds the data identifying the process which executes the remote procedure.

The central debugger 87 additionally includes a time managing portion 876 for setting a server's clock by a client's clock.

The time managing portion 876 includes a logic time calculating portion 8760, a first time comparator 8761, a first alarm setting portion 8764, a time altering portion 8765, a second time comparator 8763, a second alarm setting portion 8766, and a time-out processing portion 8767.

The logic time calculating portion 8760 is for calculating the logic time of the process.

The first time comparator 8761 functions such that when the RPC-issue detector 871 detects the issuance of a remote procedure call, the comparator responds to the detection to compare the time of the clock associated with the first process 81 as a client process in the remote procedure call communication mode with the logic time of the server process that is the latest of times of the clocks respectively associated with all the processes that are accessible to the second process 82 as a server process in the remote procedure call communication mode.

The first alarm setting portion 8764 has such a function that when the logic time is later than the time of the clock of the first process, it stops this clock and sets the time of the first process in the alarm of the clock of the process to determine the logic time.

The time altering portion 8765 responds to the detection of the end of the remote procedure call by the RPC-end detector 872 to alter the time of the clock of the first process to the time of the second process.

The second time comparator 8763 operates in a manner that when the RPC time-out detector 873 detects the time-out of the remote procedure call in a certain process, the comparator responds to the detection to compare the logic time of the second process with the time of the first process.

The second alarm setting portion 8766 has such a function that when the logic time is later than the time of the clock of the first process, it stops this clock and sets the time of the first process in the alarm of the clock providing the logic time.

The time-out processing portion 8767 operates such that when the end of the remote procedure call is detected before the time set in the alarm, it releases the alarm, and when the remote procedure call does not end till the time set in the alarm, it performs the time-out processing of the remote procedure call.

Figure 12A:
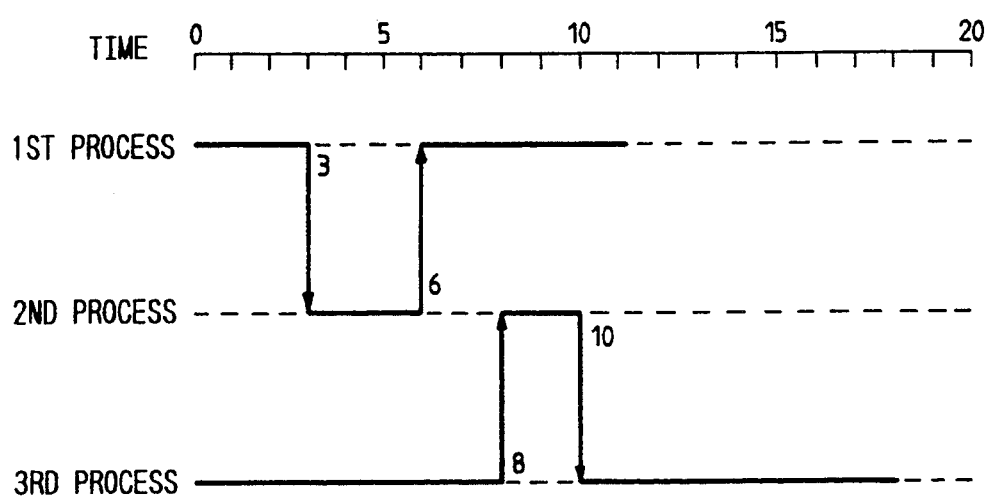
FIGS. 12(a) and 12(b) are timing charts for explaining a first operation of the debugging system of the second embodiment.
Figure 12B:
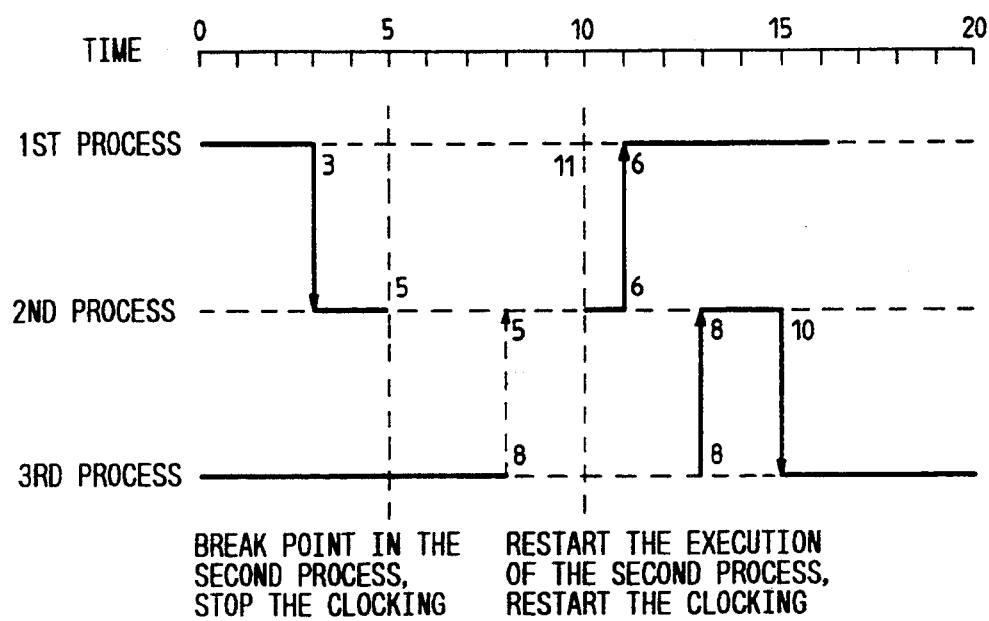

In the operation shown in FIGS. 12(a) and 12(b), the first and third processes (referred to as first and second client processes) 81 and 83, which are being debugged by the first and third satellite debuggers 84 and 86, issue remote procedure calls to the second process 82 as a server process which is being debugged by the second satellite debugger 85 in the computer where the second process 82 including the remote procedure call runs. A timing chart shown in FIG. 12(a) shows the operation of the debugging system when the interruption of the execution is not performed by the debugger. A timing chart shown in FIG. 12(b) shows the operation of the debugging system when the interruption of the execution is performed in the second process 82. In this instance, the number "n" of the satellite debuggers is 3.

By a person to debug, a break point is set in the server process 82. The first client process 81 issues a remote procedure call toward the server process 82. At time point (time "5") the server process 82 is interrupted in execution, a remote procedure call is not issued from the second client process 83 to the server process 82.

At the start of program execution, each process refers to the system clock 91 in the host machine and sets times in the clocks 88, 89 and 90 in the processes. Also when the processes are executed in a plurality of host machines, the system clocks of the host machines are previously synchronized by the protocol for synchronizing the system clocks in the host machines in the network, such as TIMED (timer server demon, TSP: The Time Synchronization Protocol for UNIX 4.3BSD, R. Gusella and S. Zatti).

In FIG. 12(b), the first process issues a remote procedure call at time "3", the second satellite debugger 85 detects that an instruction at the break-pointed position in the second process will be executed, and interrupts the execution of the server process 82 at time "5" by using the second execution interrupting portion 851, and stops the second clock 89.

At this time point, the central debugger 87 does not control the interruption of the execution another process operationg concurrently and in parallel. Accordingly, the first clock 88 and the second clock 90 continue their clocking operations.

The debugging operation progresses, and according to the instruction by a person to debug, the second satellite debugger 85 restarts the execution of the server process 82 at time "10" of the system clock. The second clock 89, which was stopped at time "5" as described above, restarts the subsequent clocking operation. When the RPC-end detector 872 detects the end of the remote procedure call issued from the server process 82 to the first client process 81, the central debugger 87 sets the first clock 88 of the first client process 81 to time "6" of the second clock 89 of the server process 82.

Figure 13A:
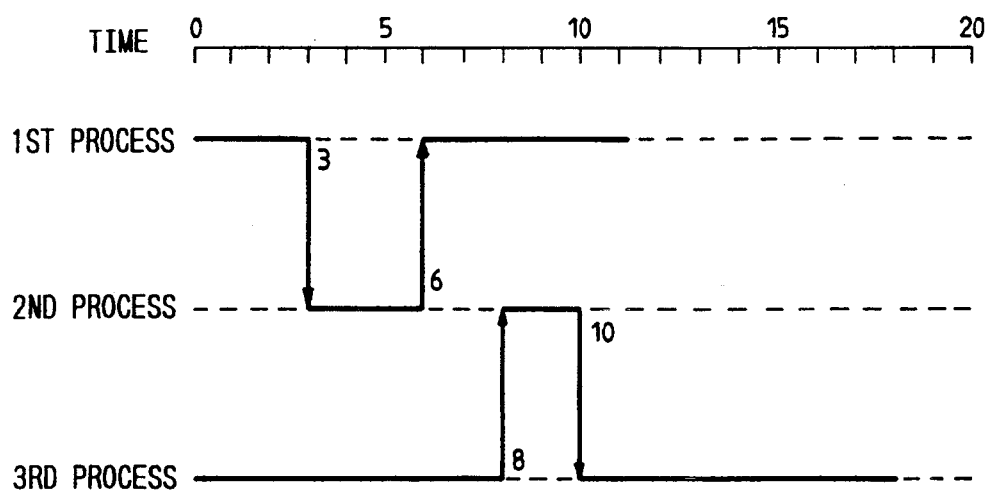
FIGS. 13(a) and 13(b) are timing charts for explaining a second operation of the same debugging system.
Figure 13B:
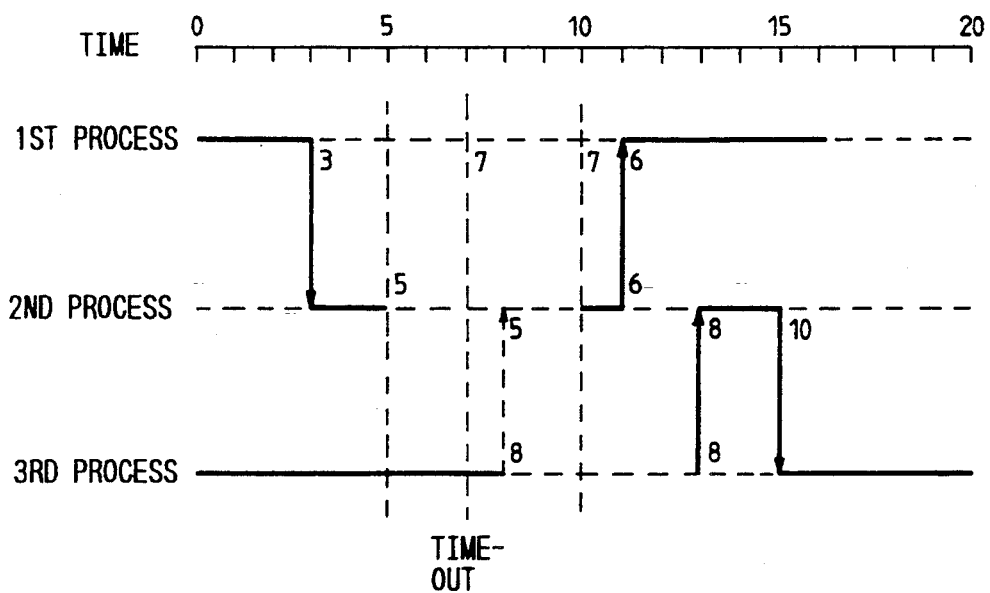

The operation of the debugging system in a case where during the debugging, the first client process 81 advances in time and the time-out of the remote procedure call occurs, will be described with reference to FIGS. 13(a) and 13(b).

Immediately before the time-out of the remote procedure call occurs in the first client process 81, the RPC time-out detector 873 detects that the time-out of the remote procedure call will occur. The central debugger 87 remotely operates the first satellite debugger 84, and stops the clocking operation of the first satellite debugger 84. That is, when the first process 81, coupled with the first satellite debugger 84, advances in time and the RPC time-out detector 873 detects the occurrence (at time "7" in FIG. 13(b)) of the time-out of the remote procedure call, the central debugger 87 controls the clocks according to a control flow shown in FIG. 11. The central debugger 87 compares the logic time (time "5") obtained by the logic time calculating portion 8760 for calculating the logic time of the process 82 with the time (time "7") of the first process 81 that is obtained referring to the first clock 88, by using the second time comparator 8763 (step S1). In this case, the logic time of the second process 82 is later than the time of the first process 81. Accordingly, the central debugger 87 remotely controls the first satellite debugger 84, to interrupt the execution of the first client process 81 (step S2), and to stop the clock 88 of the first process 81 (step S3). The second alarm setting portion 8766 sets the time of the first process 81 as an alarm time in the clock (in this instance, the clock of the second process 82 per se) to determine the logic time of the second process 82 as a server process (step S4). When the logic time of the server process (second process) is faster than the time of the client process (first process), the clock of the server process is synchronized by the clock of the client process (step S5).

The debugging operation progresses, and the second satellite debugger 85 restarts the execution of the second process 82 in response to the instruction by the person to debug. The RPC-end detector 872 detects the end of a remote procedure call issued from the second process 82 to the first process 81 before the time (time "7") set as an alarm for the time-out in the second clock. Then, the central debugger 87 remotely controls the first satellite debugger 84, causing it to restart the execution of the first process 81. At the same time, the time indicated by the clock 89 of the second process 82 is set in the clock 88 of the first process 81. When the time set in the alarm is reached before the remote procedure call directed from the second process 82 to the first process 81 ends, the central debugger 87 remotely controls the first satellite debugger 84, restarting the first process 81. Thereafter, the first client process 81 continues the processing on the presumption that the time-out occurred.

Another operation of the debugging system will be described in which the third process 83 as the second client process coupled with the third satellite debugger 86 progresses in execution, and generates a remote procedure call toward the second process 82.

With progression of the third process 83 coupled with the third satellite debugger 86, the RPC-issue detector 871 detects the generation of the remote procedure call toward the second process 82. The first time comparator 8761 in the central debugger 87 compares the time (time "8" in the case of FIG. 12(b)) of the clock 89 of the third process 83 with the logic time (time "5" in the case of FIG. 12(b)) of the second process 82 as a server process, which is calculated by the logic time calculating portion 8760. When the time of the clock of the third process 83 is faster than the logic time of the second process 82, the central debugger 87 remotely controls the third satellite debugger 86, to cause the execution interrupting portion 861 to interrupt the execution of the third process 83 and to stop the clock 90 of the third process 83. Further, it sets the time (time "8" in the case of FIG. 12(b)) of the third process 83 as an alarm in the clock of the process to determine the logic time of the second process 82.

With progression of the debugging operation, the person attempting to debug instructs the second satellite debugger 85 to restart the execution of the second process 82. When the clock of the second process 82 indicates the time (time "8" in the case of FIG. 12(b)) set in the alarm, the central debugger 87 remotely controls the third satellite debugger 86 to restart the execution of the third process 83.

At the time of starting the process execution, each process refers to the system clock 91 of the host machine and sets the time in each clock 88, 89 and 90 of the process.

Figure 14A:
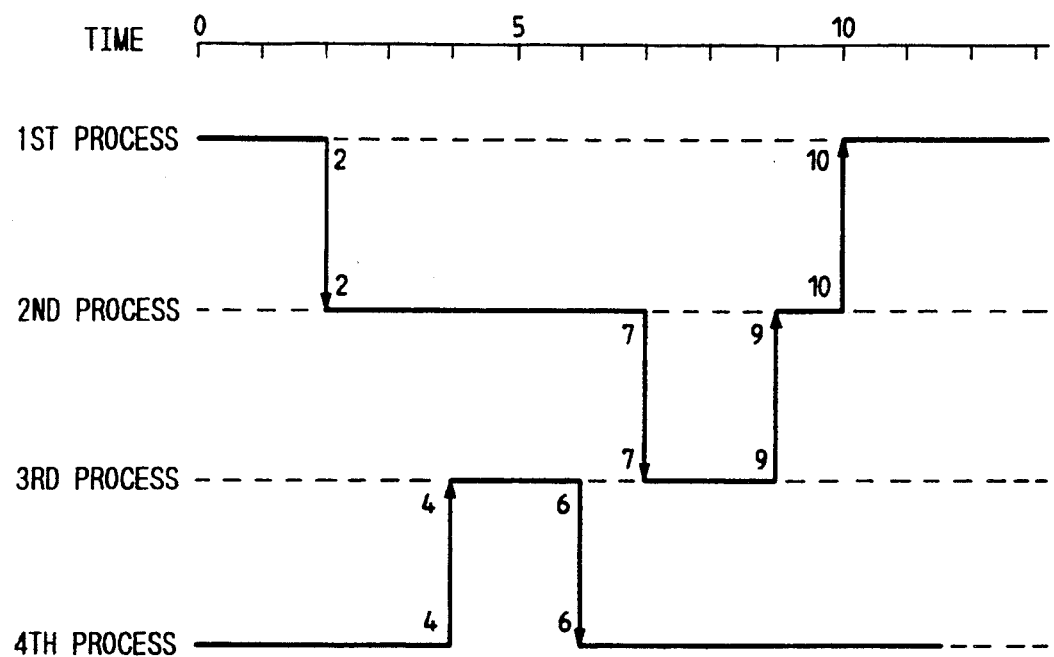
FIGS. 14(a) and 14(b) are timing charts for explaining a third operation of the same debugging system.

A timing chart shown in FIG. 14(a) diagrammatically illustrates the following operation without the debugging operation. At time "2", the first process issues a remote procedure call toward the second process. At time "7", the second process issues a remote procedure call toward the third process. At time "9", the third process sends a return for the remote procedure call to the second process. At time "10", the second process sends a return for the remote procedure call to the first process. At time "4", the fourth process (not illustrated in FIG. 8) issues a remote procedure call to the third process. At time "6", the third process sends a return for the remote procedure call to the fourth process.

Figure 14B:
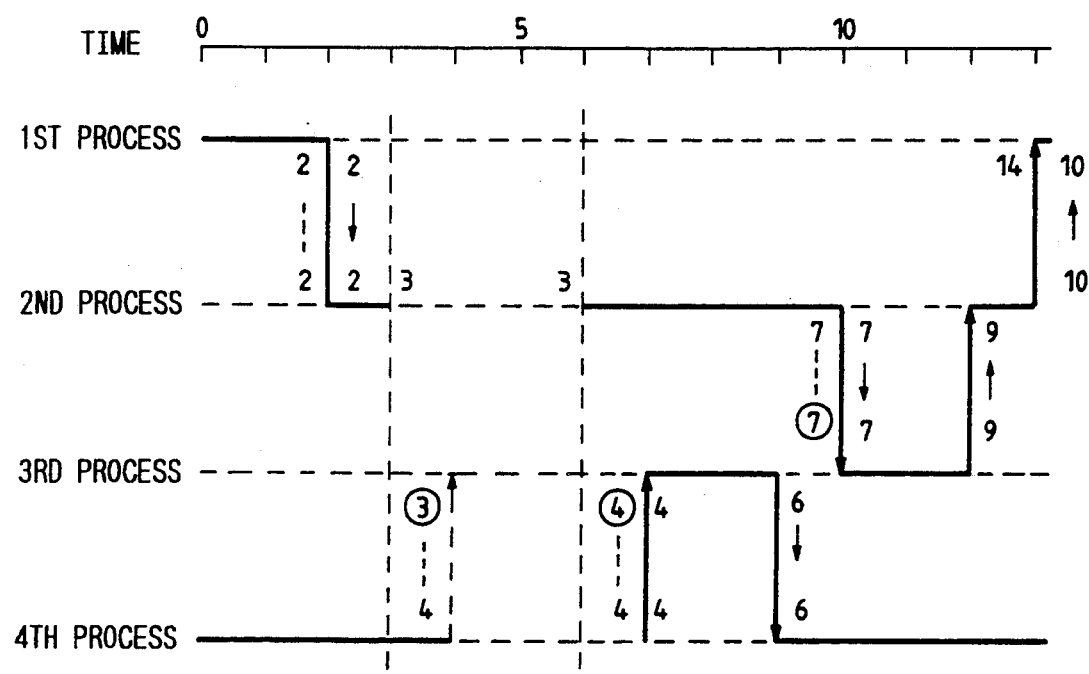

A timing chart shown in FIG. 14(b) diagrammatically illustrates the operation of the debugging system when the debugging operation is performed. In the operation, at time "3" the second process stops at the break-pointed position and is interrupted in execution. At time "6", the execution of the process is restarted.

During the execution of the second process, the second process is interrupted in execution at the break-pointed position at system time "3", and further the second satellite debugger 85 stops the clock 89 of the second process 82.

At this time point, the fourth process continues in its execution and the other clocks other than the second clock all run.

The fourth process starts to issue a remote procedure call to the third process at system time "4". A break point is previously set in the process immediately before the remote procedure call is issued. When the fourth satellite debugger detects the break point, it interrupts the execution of the fourth process and sends the issuance of the remote procedure call to the central debugger 87. The central debugger 87 looks up in the process-to-server-process table 875 the process ID of the process to which the fourth process will issue a remote procedure call, through the fourth satellite debugger, and knows that the called process is the third process. The central debugger 87 drives the first time comparator 8761 to compare the logic time of the third process with the time "4" of the fourth process to be called with a remote procedure call. The logic time is the latest time (in this instanced time "3" of the second process) of the times all the process (in this instance, the first to fourth processes) possibly accessible to the third process which is currently remote-procedure calling that can be looked up in the process-to-server-process table 875. The logic time of the third process as a server process is later than the time of the fourth process. Then, the execution of the fourth process remains interrupted, and the time of the fourth process and the process ID are set in the alarm of the second process determining the logic time of the server process.

When the system time reaches time "6", a person attempting to debug instructs the restart of the execution of the second process, from the central debugger 87. The central debugger 87 causes the second satellite debugger 85 to restart the execution of the second process, and to operate the clock of the second process, which has been stopped.

Afterwards, when the system time reaches time "7", the clock of the second process indicates time "4", the alarm that has been set is detected, and the process ID "4" that has been set is sent through the satellite debugger to the central debugger 87.

The central debugger 87 instructs the fourth satellite debugger, coupled with the transmitted process ID, to restart the fourth process. Then, the central debugger 87 drives the clock of the fourth process that has been stopped, and sets the time of the clock of the fourth process in the clock of the third process as a server process.

The fourth process of which the execution is restarted issues a remote procedure call.

As described above, in the present embodiment, by properly controlling the satellite debugging means coupled with the server processes and the client processes, the program debugging system can interrupt and restart the execution of the concurrent and parallel operating processes without the broadcasting type process-to-process communication means, ensuring such a state that the results of the program execution when those processes are interrupted and restarted in execution are the same as the execution results when the processes are not subjected to the interruption/restart process. Therefore, a person attempting to debug can debug the program on the interruption/restart basis without the broadcasting process-to-process communication means.

Particularly, in the present embodiment, as shown in FIG. 14(b), when the interruption times, which result from the break-pointing in the processes, partially overlap in the plurality of processes, there is no need of setting the delay time to be equal to the sum of the interruption times. Therefore, the delay time of the whole system can be reduced.

As seen from the foregoing description, according to the present invention, by properly controlling the satellite debugging means coupled with the server processes and the client processes, the program debugging system can interrupt and restart the execution of the concurrent and parallel operating processes without the broadcasting type process-to-process communication means, ensuring such a state that the results of the program execution when those processes are interrupted and restarted in execution are the same as the execution results when the processes are not subjected to the interruption/restart process. Therefore, a person to debug can debug the program on the interruption/restart basis without the broadcasting process-to-process communication means.

When a plurality of programs are concurrently interrupted and restarted in execution, there is no need for summing the interruption times and hence the delay time of the whole system can be minimized.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A program debugging system for a distributed data processing system of the type in which a plurality of processes communicate with one another to realize their concurrent and parallel operations, said debugging system comprising:

a plurality of satellite debugging means, coupled respectively with said plurality of processes, for debugging said processes;

central debugging means for remotely controlling said plurality of satellite debugging means; and remote-procedure-call detecting means for previously detecting an issuance or an end of a remote procedure call in the process to be debugged by said satellite debugging means, wherein each of said satellite debugging means includes:

execution interrupting means for interrupting the execution of the process to be debugged and transmitting a message of the execution-interruption to said central debugging means;

execution restarting means for restarting the execution of the interrupted process and transmitting a message of the execution-restart to said central debugging means;

interruption-time notifying means for calculating an execution-interruption time on the basis of the interruption and restart of the execution of the process and for transmitting the calculated interruption time to said central debugging means; and execution delay means for delaying, when said remorse-procedure-call detecting means detects the issuance of a remote procedure call by a process, the execution of the remote procedure call according to information including the execution-interruption time of another process that is transmitted from said central debugging means.

2. The debugging system according to claim 1, wherein said interruption-time notifying means includes:

interruption-time holding means for holding a time on which said execution interrupting means starts the execution-interruption of the process;

interruption-time calculating means for calculating the interruption time by using the time held in said interruption-time holding means and the time on which said execution restarting means starts the execution of the process; and notifying means for notifying said central debugging means of the calculated interruption time.

3. The debugging system according to claim 2, wherein said central debugging means includes:

means for obtaining an execution delay time caused by the execution-interruption by summing the interruption time received from a certain satellite debugging means and the time necessary for transmitting the interruption time to all the remaining satellite debuggers; and means for notifying all the remaining satellite debugging means of the execution delay time.

4. The debugging system according to claim 1, wherein said execution delay means includes:

an execution-delay-time receive queue for holding, when receiving an execution-restart instruction containing said execution delay time from said central debugging means, the execution delay time, if required; and a timer for generating a delay time corresponding to the execution delay time.

5. The debugging system according to claim 1, wherein said satellite debugging means includes a process-to-serve-process table which for a process being debugged accepts, every process issuing a remote procedure call, the remote procedure call for the process, and holds data identifying the process to execute the remote procedure call.

6. The debugging system according to claim 1, wherein each of said satellite debugging means includes:

a time-out clock for detecting a time-out of the remote procedure call of each process; and time-out-turn-back-time holding means functioning such that when the time-out occurs, on the presumption that no time-out occurs, said time-out-turn-back-time holding means holds a time period for which said time-out clock is turned back.

7. The debugging system according to claim 1, wherein said central debugging means includes:

interrupted-process identifying data holding means for receiving and storing data to identify the process interrupted in execution by each of said satellite debugging means from the satellite debugging means; and a process-to-client-process table for holding data to identify a process which for the process being debugged issues, every process executing a remote procedure call, a remote procedure call for the process.

8. A program debugging system for a distributed data processing system of the type in which a plurality of processes communicate with one another to realize their concurrent and parallel operations, said debugging system comprising:

a plurality of satellite debugging means, coupled respectively with said plurality of processes, for debugging said processes; and central debugging means for remotely controlling said plurality of satellite debugging means, wherein said central debugging means includes:

remote-procedure-call detecting means for previously detecting an issuance, an end or a time-out of a remote procedure call in the process to be debugged by said satellite debugging means; and time managing means functioning such that when said remote-procedure-call detecting means detects the issuance, the end or the time-out of the remote procedure call, said time managing means adjusts time of clocking means of a process associated with the remote procedure call, and wherein each of said satellite debugging means includes:

clocking means associated with said plurality of processes to be debugged;

execution interrupting means for interrupting the execution of the process to be debugged and for stopping the clocking means associated with said process; and execution interrupting means for restarting the execution of said interrupted process and the operation of said clocking means associated with said process as well.

9. The debugging system according to claim 8, wherein said time managing means is arranged so as to adjust the time of said clocking means of each said satellite debugging means to be equal to the time of the clocking means having the longest interruption time in clocking means stopped by said execution interrupting means and restarted by said execution restarting means.

10. The debugging system according to claim 8, wherein said time managing means includes:

first time comparator means functioning such that when the remote-procedure-call detecting means detects the issuance of the remote procedure call, said first time comparator means responds to the detection to compare the time of the clocking means associated with a first process as a client process in a remote procedure call communication mode with the logic time that is the latest of times of the clocking means respectively associated with all the processes that are accessible to the second process as a server process in the remote procedure call communication mode;

first alarm setting means having such a function that when the logic time is later than the time of the clocking means of the first process, said first alarm setting means stops the clocking means of the first process and sets the time of the first process in the alarm of the clocking means of the logic time; and time altering means responding to the detection of the end of the remote procedure call by said remote-procedure-call detecting means to alter the time of the clocking means of said first process to the time of said second process.

11. The debugging system according to claim 8, wherein said time managing means includes:

second time comparator means operating in a manner that when the remote-procedure-call detecting means detects the time-out of the remote procedure call in a certain process, said second time comparator means responds to the detection to compare the logic time of said second process with the time of said first process;

second alarm setting means having such a function that when the logic time is later than the time of the clocking means of said first process, said second alarm setting means stops the clocking means of the first process and sets the time of said first process in the alarm of the clocking means providing the logic time; and time-out processing means operating such that when the end of the remote procedure call is detected before the time set in the alarm, said time-out processing means releases the alarm, and when the end of the remote procedure call is not detected till the time set in the alarm, said time-out processing means performs time-out processing of the remote procedure call.

* * * * *

UNITED STATES PATENT AND TRADEMARK OFFICE
CERTIFICATE OF CORRECTION

PATENT NO. : 5,371,746
DATED : December 06, 1994
INVENTOR(S) : Ichiro YAMASHITA et al.

It is certified that error appears in the above-indentified patent and that said Letters Patent is hereby corrected as shown below:

Claim 5, Column 21, Line 18 change "serve" to
--server--.

Signed and Sealed this

Sixteenth Day of May, 1995

*Attest:*

BRUCE LEHMAN

*Attesting Officer*   *Commissioner of Patents and Trademarks*